United States Patent [19]

Ehrlich

[11] Patent Number: 4,881,859
[45] Date of Patent: Nov. 21, 1989

[54] TRAILER FOR SELECTIVELY TRANSPORTING VEHICLES AND GENERAL FREIGHT

[75] Inventor: Rodney P. Ehrlich, Monticello, Ind.

[73] Assignee: Wabash National Corporation, Lafayette, Ind.

[21] Appl. No.: 253,443

[22] Filed: Oct. 6, 1988

[51] Int. Cl.$^4$ .............................................. B60P 3/08
[52] U.S. Cl. ................................... 410/29.1; 280/789
[58] Field of Search ........................ 410/3, 4, 24, 24.1, 410/26, 28.1, 29, 29.1, 66, 25, 27, 28; 105/413, 414; 280/786, 787, 789, 790, 791; 296/181, 183, 182, 204

[56] References Cited

U.S. PATENT DOCUMENTS

| | | | |
|---|---|---|---|
| 2,974,999 | 3/1961 | Stuart | 410/28.1 |
| 2,993,725 | 7/1961 | Van Keuren | 410/24.1 |
| 3,043,454 | 7/1962 | Butler et al. | 410/26 |
| 3,913,496 | 10/1975 | Lohr | 410/26 X |
| 3,993,342 | 11/1976 | Jones et al. | 280/789 |
| 4,092,039 | 5/1978 | Lutkenhouse | 296/181 |
| 4,369,008 | 1/1983 | Cooper | 410/24.1 |
| 4,701,086 | 10/1987 | Thorndyke | 410/26 |

FOREIGN PATENT DOCUMENTS

| | | | |
|---|---|---|---|
| 2455528 | 4/1980 | France | 410/4 |
| 704213 | 4/1966 | Italy | 410/24.1 |

*Primary Examiner*—Dennis H. Pedder
*Assistant Examiner*—Joseph D. Pape
*Attorney, Agent, or Firm*—Richard Bushnell

[57] ABSTRACT

A standard-dimensioned, double-deck trailer capable of transporting six full-size cars and finding utility as well in the handling of general freight and merchandise, the latter to be loaded from either side or from the rear of the trailer. In addition to a floor, the trailer includes a deck which is hydraulically positionable as an inclined ramp for loading and unloading of vehicles carried on the deck, and which is adjustable to assume a horizontal mode during transport of the vehicles thereon. The deck can be elevated to an out-of-the-way storage position upon unloading of the vehicles, thus providing clear and unobstructed cargo space within the trailer for receiving freight for transport. The trailer frame is characterized in that it includes laterally spaced, elongated beam assemblies which define inside beam elements disposed within the rear wheels of the trailer, and outside beam elements which extend along an outer margin of the frame at a forward end of the trailer. Special ramp devices are provided for enabling the trailer to serve as a transport for six full-size cars, and additional ramp mechanisms ensure that the space overlying the coupler section of the trailer may be effectively accessed and used for the storage of freight when the vehicles are not in transport.

9 Claims, 4 Drawing Sheets

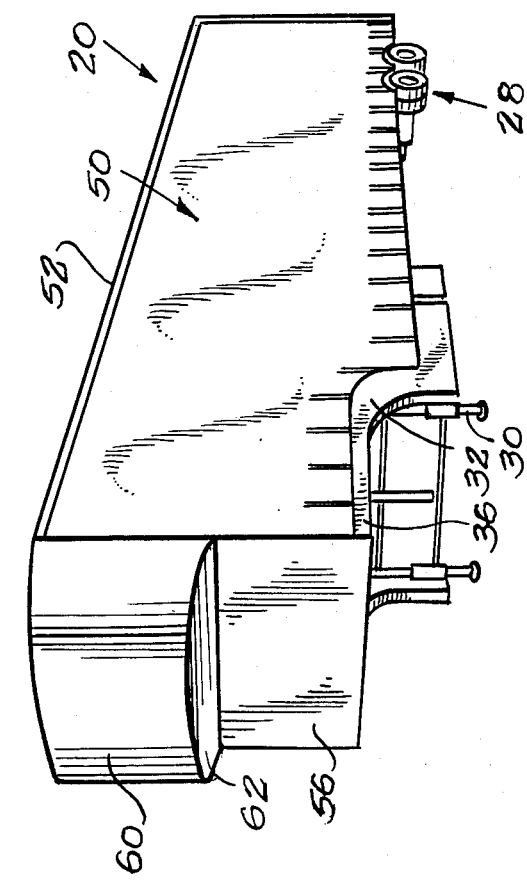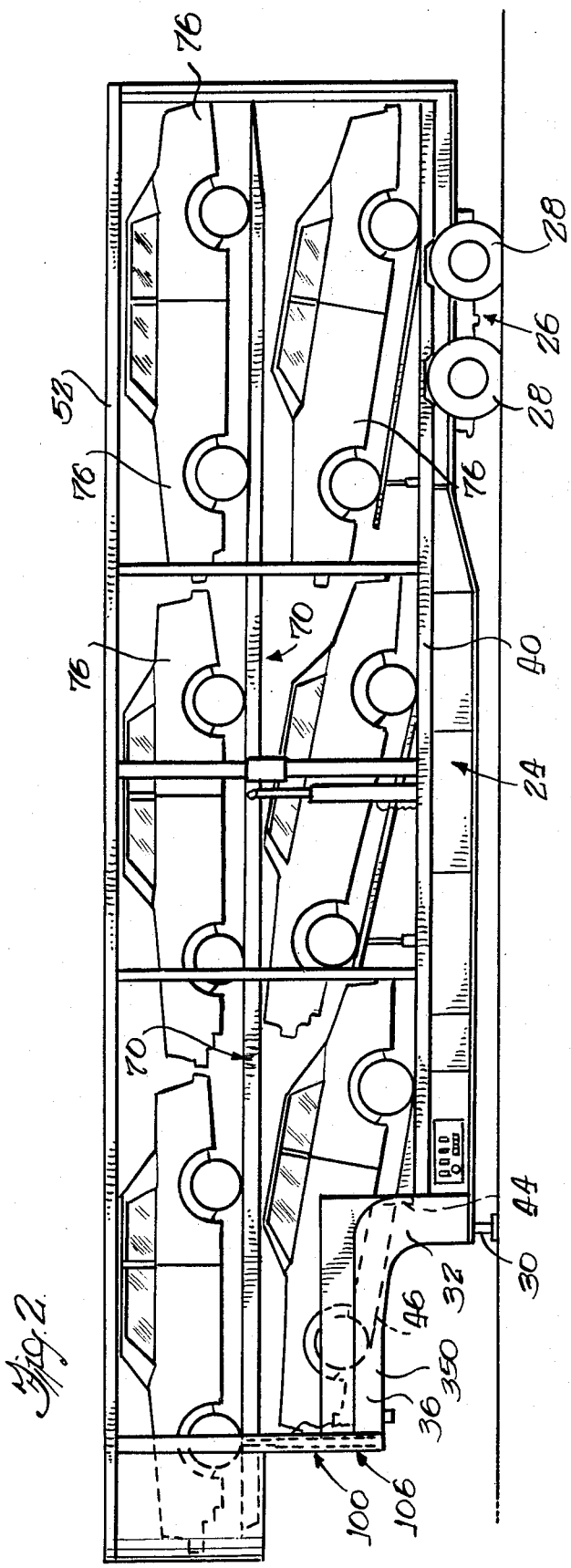

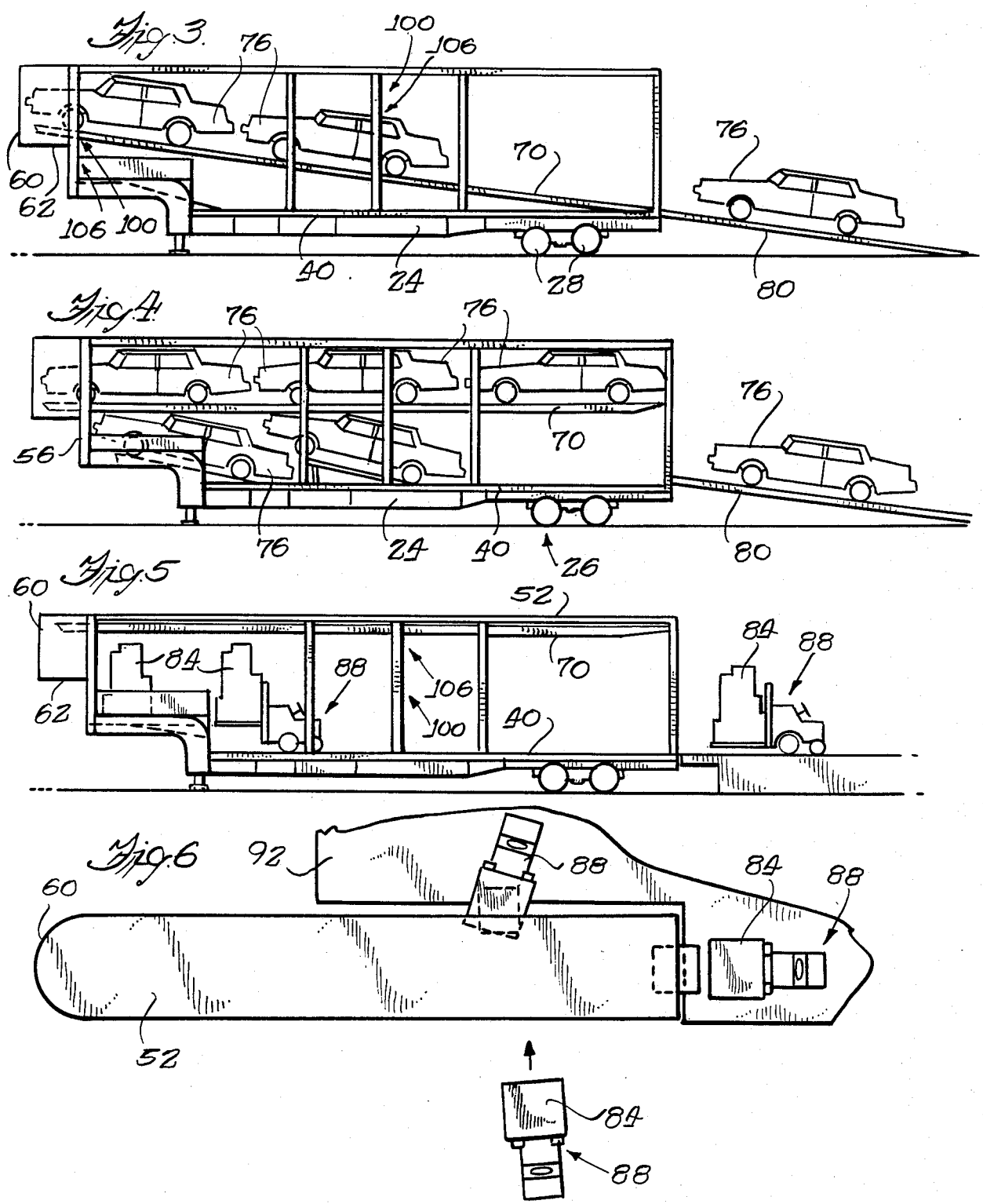

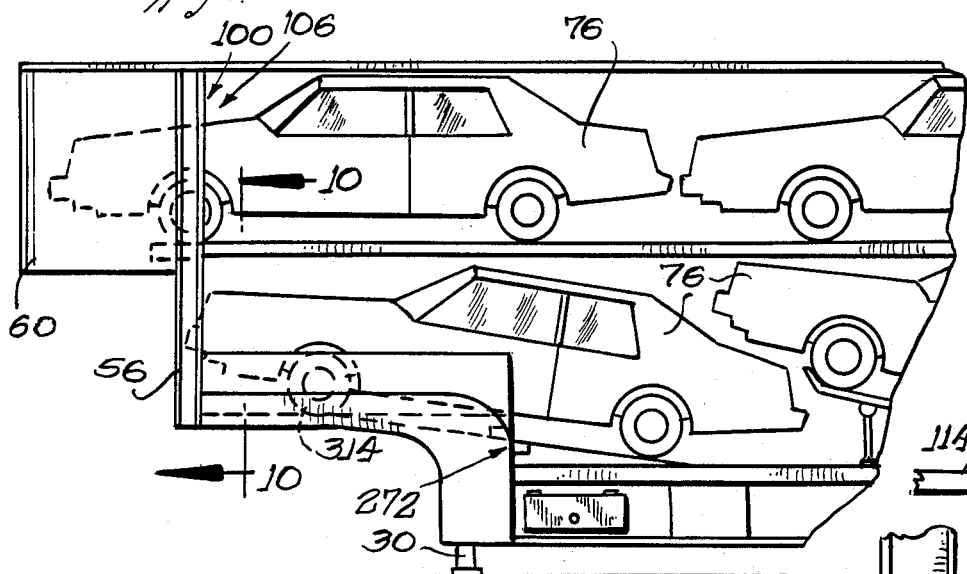
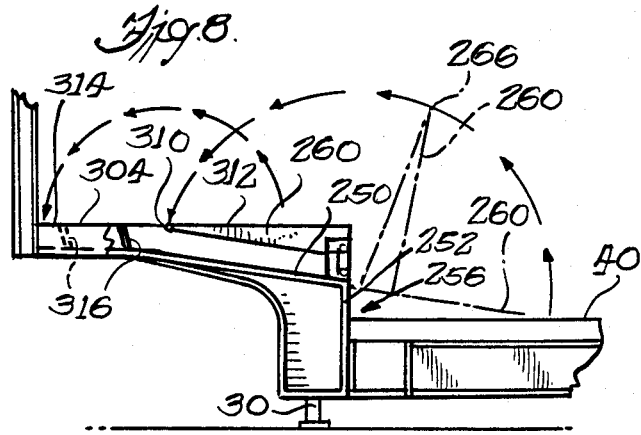
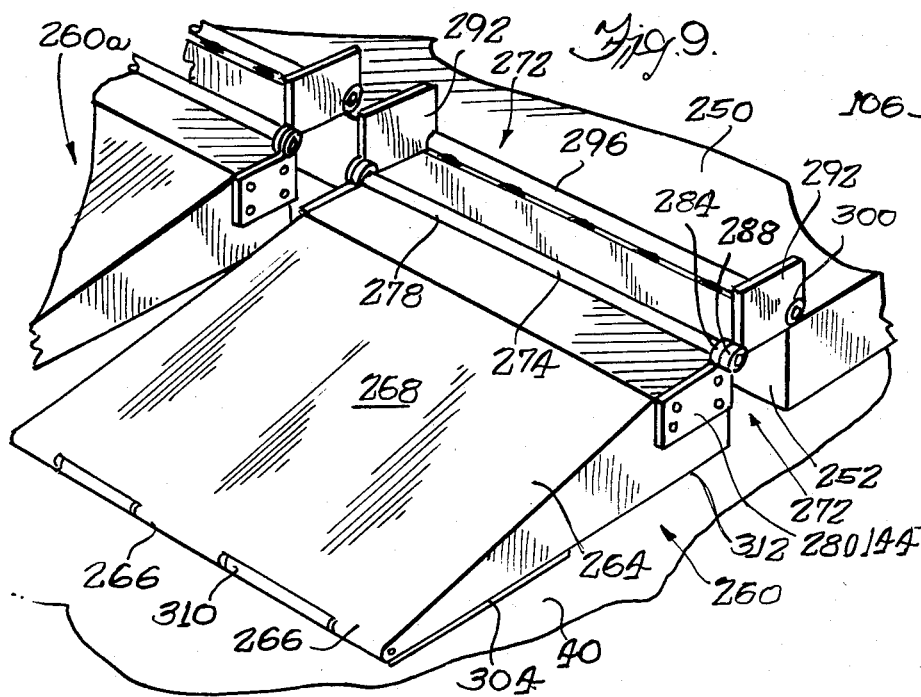
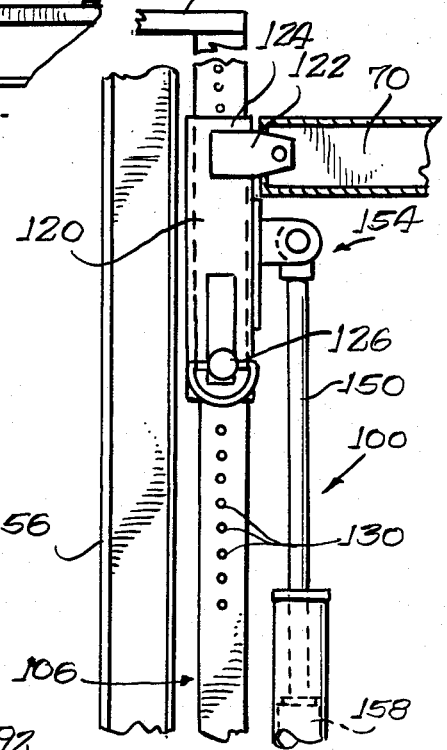
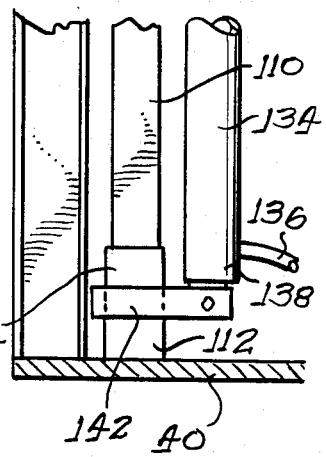

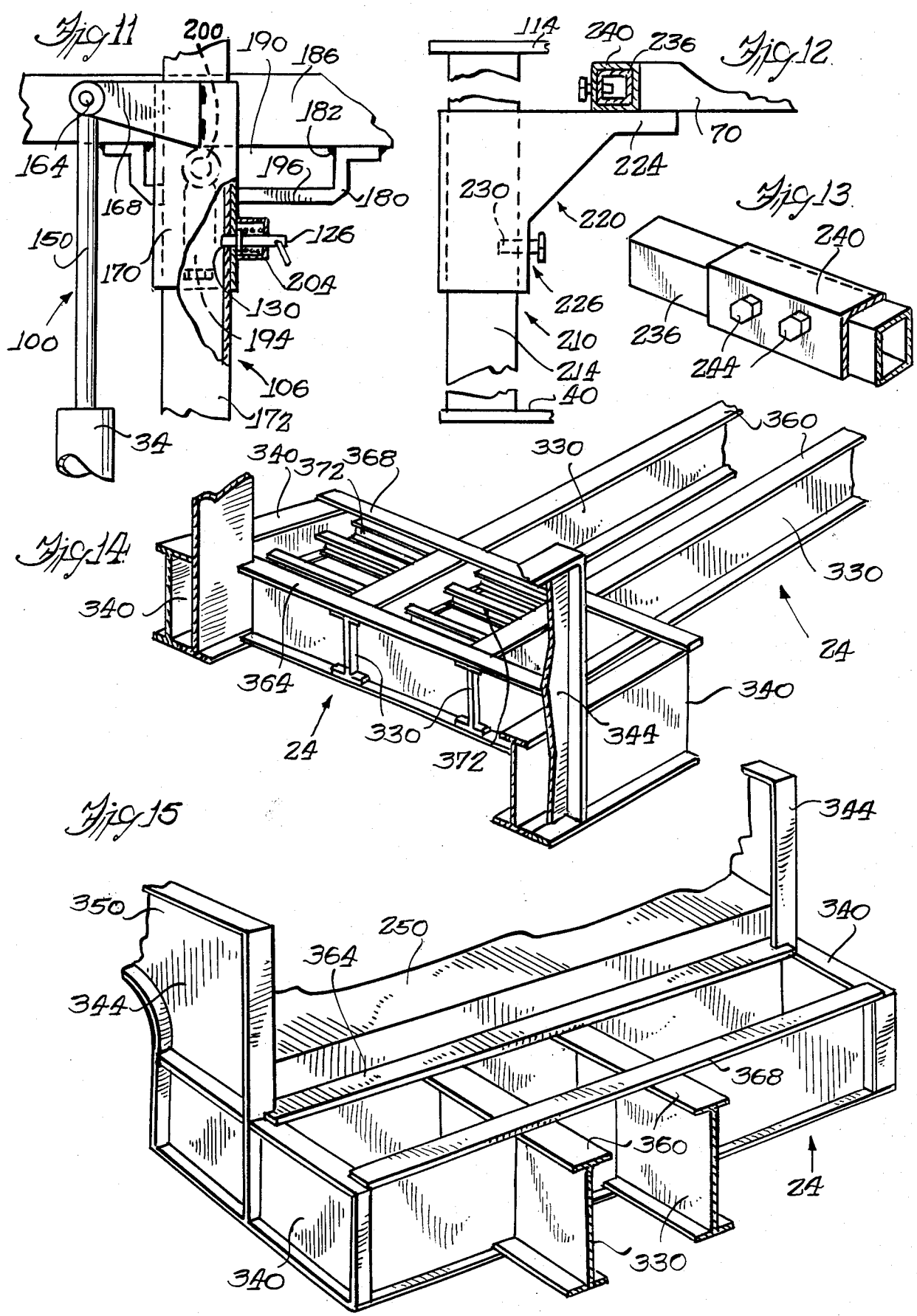

TRAILER FOR SELECTIVELY TRANSPORTING VEHICLES AND GENERAL FREIGHT

This application is a continuation of application Ser. No. 038,857, filed Apr. 15, 1987, now abandoned.

FIELD OF THE INVENTION

The present invention relates to a trailer. More particularly, the invention is directed to a trailer of standard dimensions and which is capable of transporting six full-sized cars in an enclosed body and which is readily adapted for transporting general freight.

Many and varied types of trailers are described in the art as suitable for the transport of automobiles and other vehicles. For the most part, such trailers are designed specifically for this sole utilitarian function and are ill-adapted for the transport of freight in general. Conversely, trailers including flatbed trailers as well as "van-type" trailers suitable for the transport of various types of general freight are not capable of transporting more than three full-sized cars. It is, accordingly, a principal aim of the present invention to provide a trailer which obviates the shortcomings of prior art structures and which possesses that degree of versatility and adaptability to enable effective use both as a car carrier and a carrier of general freight.

SUMMARY OF THE INVENTION

The present invention provides a double-deck trailer of "standard" overall dimensions and which is capable of transporting six full-size cars, the trailer finds utility as well in the handling of general freight. In a flatbed trailer embodiment of the invention, the trailer can be loaded from either side or from the rear. In addition to a floor, the trailer includes a deck which is hydraulically positionable as an inclined ramp for loading and unloading vehicles carried on the deck, and which is adjustable to assume a horizontal mode during transport of the vehicles thereon. The deck can be elevated to an out-of-the-way storage position upon unloading of the vehicles, thus providing clear and unobstructed cargo space within the trailer for receiving freight for transport.

The trailer frame is characterized in that it includes laterally spaced, elongated beam assemblies which define inside beam elements disposed within the rear wheels of the trailer, and outside beam elements which extend along an outer margin of the frame at a forward end of the trailer.

It is an important feature of the invention that in a preferred embodiment the trailer is a flatbed trailer, so that freight may be loaded from either side as well as from the rear.

In the flatbed trailer embodiment of the invention, a roof and curtained sidewalls are provided to protect the cargo.

It is an important practical feature of the trailer of the invention that it is of standard dimensions, that is, 48 feet long and 13.6 feet high, and that six "full-size" cars may be transported within the trailer itself.

The trailer of one embodiment of the invention embodies structural features of a flatbed trailer, but is actually a double-deck trailer in which the trailer floor (or lower "deck") and an overlying, second trailer deck each carry three automobiles in transport.

The upper deck of the trailer is elevationally positionable and is tiltable by means of hydraulic jacks so as to assume the configuration of an inclined ramp for loading and unloading vehicles carried on the deck.

A related feature of the deck structure is that the hydraulic jacks include the capability of orienting the deck to extend in a horizontal mode and in a plane elevated with respect to the floor of the trailer. Locking mechanisms are provided to secure and retain the deck in this elevated position, with the automobiles anchored thereon.

It is another feature of the deck and the associated hydraulic mechanisms that the deck may be elevated upwardly to a storage position adjacent the roof of the trailer so that the deck itself is removed as a physical obstruction in the trailer, thus providing a clear and unimpeded cargo space within the trailer for receiving freight to be transported.

The trailer of the present invention utilizes underframes which support essentially the entire load. It is a feature of the underframes of the trailer of the present invention that the longitudinally extending load-bearing beams include, in combination, longitudinally interconnected inside beam elements and outside beam elements, the inside beam elements being offset inwardly within lateral bounds of the frame and disposed inwardly of the rear wheels of the trailer, while the outside beam elements extend along an outer margin of the frame at a forward end of the trailer. It will be appreciated that at their forward ends the outside beam elements extend upwardly so as to project over the back end of the prime mover or tractor. The rear ends of the inside beams are positioned to clear the rear axles of the trailer. That is, the present invention is directed to a flatbed trailer which, in effect, uses a frame which is a combination of an outside frame and an inside frame. The longitudinally extending frame members of the "outside-inside" frame may each constitute a single, continuous beam bent to assume the desired configuration.

It is a related feature of the invention that the floor of the trailer is recessed with respect to the beams at the forward end of the trailer, and rides on the upper face of the inside beams at the rearward end of the trailer.

It is a feature of one embodiment of the frame of the trailer of the invention that there is provided a fabricated juncture of the inside beam elements with the outside beam elements. The juncture is selectively located, as preferred, between the lineal limits defined by the tractor wheels and the rear wheels of the trailer itself.

In a preferred embodiment of the invention, the mechanical juncture assembly comprises a pair of spaced, parallel, heavy crossbeams welded to and extending between the outside beams at longitudinally spaced positions, and welded to the inside beams.

In a preferred embodiment of the invention the inside beams will pass through one of the transverse beams, and this transverse beam will preferably be fabricated of multiple parts welded to one another.

It is a feature of preferred embodiments of the invention that the crossbeams are spaced so that the downward impressed on the beam through which the inside longitudinal beams "extend" is about equal to the upload on the transverse beam which is welded against the terminal, forward end of the inside beam. The arrangement described minimizes adverse effects of bending movements and obviates a twisting of the transverse beams.

It is a feature of the flatbed embodiment of the present invention that the superstructure supported on the flatbed frame includes a plurality of upright supports, including four corner posts and several intermediate posts, supporting a roof.

In the floor of the trailer of the invention, the front portion is elevated to accommodate a "van-type" coupler. A portion of the elevated floor intermediately forward of the floor proper is included upwardly at the coupler section.

It is an important feature of the present invention that there is provided a hinged or otherwise positionable, generally wedge-shaped ramp which may be placed to overlie the inclined floor sector in a manner to establish a horizontal surface at the initially inclined zone.

In one embodiment of the invention a plate is hingedly attached to the ramp along an apex-like end edge thereof. The plate is adapted to be unfolded forwardly to establish an extension of the useful horizontal surface at the forward extremity of the trailer. Pivotally adjustable supports are positionable to assume an upright attitude beneath the plate as stabilizers.

It is a related feature of the invention that in an alternative positional mode, the wedge-like ramp overlies and is supported on the trailer floor itself to serve as a ramp between the principal floor and the elevated floor section at the forward, coupler end of the trailer.

In a preferred embodiment of the invention the ramp includes two or more laterally-placed separate ramp sections for ease of manual manipulation.

It is an important feature of the present invention that with the ramp hinged to extend forwardly and to convert the inclined portion of the elevated floor sector to a horizontal surface, the elevated forward sector of the floor may conveniently receive freight loaded either from the back or from the side of the trailer, using forklift trucks and similar loading devices.

Important additional features of specific embodiments of the trailer of the present invention increase the effective length of the trailer and provide solutions to the problem that the overall lineal dimension of the truck (48 feet) may not be quite great enough to permit the simple intrusion of three full-size automobiles, end-to-end. In a preferred embodiment of the invention, this problem is solved, with respect to the lower deck level or floor, by providing one or more spaced ramps or lift plates for elevating front ends of the vehicles to effect vehicle tilting and establish an overlapping of the cars so that a forward end portion of a given car overlies a rear portion of the car immediately in front.

In a preferred embodiment of the invention, the cars are arranged on the elevated deck in a horizontal disposition, and the required "supplemental" length is achieved by providing a protruding bay in the front wall of the trailer for accommodating a forward end portion of the front vehicle transported on the deck.

In a preferred embodiment of the invention the trailer has open sides for side-access loading, and is provided with side curtains for closing the sides of the trailer for cargo protection and security.

It is a related feature of the invention that there is provided motor means by which the side curtains are moved upwardly and downwardly between trailer-open and trailer-closed modes.

If one is willing to forego the side-loading option, the trailer may be of the "van-type", with fixed sidewalls, the latter defining the load supporting elements.

Other and further features, objects and advantages of the invention will become evident from the following description considered in conjunction with the drawings.

BRIEF DESCRIPTION OF THE DRAWINGS

FIG. 1 is a perspective view of a trailer, according to the present invention, and having curtain sides, shown in a closed configuration;

FIG. 2 is a side elevational view of the trailer of the invention depicting, schematically, the two-tiered array of vehicles stored in a transport mode;

FIG. 3 shows the trailer with the shiftable deck angled as a ramp, during the loading of vehicles thereon;

FIG. 4 indicates, schematically, the loading of vehicles on the trailer floor after the loaded deck has been raised to a transport position;

FIG. 5 is a side elevational view of the trailer of the invention with the deck raised to a storage position and the trailer floor as well as the raised forward lower section cleared for loading of cargo;

FIG. 6 is a top plan view indicating schematically the use of forklift trucks in loading from either side as well as from the end of the trailer;

FIG. 7 is a fragmentary side elevational view showing details of the arrangement for two-tier vehicle positioning at a forward end of the trailer;

FIG. 8 is a side elevational view showing the forward portion of the trailer floor and a pivotal ramp assembly providing wheeled access to the raised floor sector;

FIG. 9 is an enlarged, fragmentary perspective view showing the pivotally hinged ramps at a forward end of the lower floor of the trailer;

FIG. 10 is an enlarged, fragmentary elevational view taken substantially on the lines 10—10 of FIG. 7 and showing a structure by which the positionable deck of the trailer is elevated hydraulically at a forward end of the trailer, and secured in place;

FIG. 11 is an enlarged, fragmentary view, with parts broken away, and showing a hydraulic lift and a post-carried interlock for securing the deck in place at a selectable elevation;

FIG. 12 is a fragmentary, side elevational view showing one of the vertically positionable rear brackets for supporting a corner of the deck of the trailer;

FIG. 13 is a perspective view illustrating a slidably-positionable, laterally-extending, deck-carried shaft which is selectively positionable to engage and bear upon a rear corner, post-carried, deck-supporting bracket;

FIG. 14 is a perspective view of one form of a cross-beam assembly serving as a coupler between outside and inside beams of the trailer frame, according to the invention; and FIG. 15 is a fragmentary, perspective view showing one embodiment of the forward end structure of the frame of the trailer of the invention.

DETAILED DESCRIPTION OF THE ILLUSTRATED EMBODIMENTS

The aims and objects of the present invention are achieved by providing in a standard-dimensioned trailer, of a flatbed type or of a van configuration, a double-deck assembly rendering the trailer capable of transporting six full-size cars, the trailer finding utility as well in the handling of general freight and merchandise. In the flatbed embodiments of the trailer, the latter may be conveniently loaded from either side and from the rear as well, and the trailer is fitted with curtain-like sides for security and for protecting the cargo from the elements.

An important feature of the trailer of the invention is that, in addition to a floor, the trailer includes a deck which is hydraulically positionable, as an inclined ramp for loading and unloading of vehicles, and which is adjustable to assume a supported horizontal mode during transport of the vehicles carried thereon. The deck itself can be elevated to an out-of-the-way storage position upon unloading, thus providing clear and unobstructed cargo space within the trailer for receiving freight and merchandise for transport. Auxiliary mechanical features including special ramp arrangements serve to increase the effective useful length of the trailer, and the trailer frame is characterized in that it includes laterally spaced elongated beam assemblies which define inside beam elements disposed within the rear wheels of the trailer, and outside beam elements which extend along an outer margin of the frame at a forward end of the trailer.

Referring more particularly to the drawings, there are shown, for the purpose of illustrative disclosure and not in any limiting sense, preferred embodiments of the trailer of the invention incorporating the teachings thereof. In the embodiment of the invention depicted in FIGS. 1-6, the trailer 20 includes a chassis or frame 24 supported at its rear on a wheel truck assembly 26, including rear wheels 28, and provided with vertically adjustable stanchion posts 30 at the front. At its forward end, the frame 24 includes girder components 32 extending arcuately upwardly and terminating in laterally-spaced, generally-horizontally projecting arms 36 for overlying a tractor to be coupled to the trailer. A floor 40 is supported on the trailer frame 24 and includes, at its forward end, a step 44 and an upwardly-angled raised sector 46, as shown in FIG. 2. In the specific embodiment of the trailer shown in FIG. 1, there are sidewalls 50, a roof 52, a front wall 56 and rear doors 60. The sidewalls 50 shown are curtain-like and retractable upwardly, by means of a motor (not shown). The sidewalls 50 may, however, if preferred, be of the permanent, load-supporting rigid type as typified by "vans". As clearly shown in FIG. 1, the front wall 56 of the trailer is formed at its upper section with a bay-like protrusion 60 and a floor 62.

As shown in FIGS. 2-4 and 7, in addition to the floor 40, a trailer 20 includes a second floor or a deck 70, the latter being adjustable positionable and being shown in an elevated, car-carrying disposition in FIGS. 2 and 4. As there also shown, three full-size automobiles 76 are carried on each of the floor 40 and the raised deck 70, the cars 76 on the upper deck being in a straight line array and horizontal, while the cars on the lower floor 40 are supported at angles in an overlapping array, as explained more fully herebelow.

As previously indicated, the second floor or deck 70 of the trailer 20 is not fixed in position, but is, rather, adjustable both for angle and elevation. In FIG. 3 the deck 70 is shown in an angular mode assumed during the loading of cars onto the deck, a suitable auxiliary ramp 80 being employed in the conventional manner to raise the automobiles from ground level to the level of the trailer floor. In FIG. 4 the deck 70 is shown in a horizontal, car-carrying mode and with the lower interior of the truck cleared for loading of cars on the lower level or truck floor 40. In FIG. 5 the deck 70 is shown in a completely elevated, stored position adjacent and underlying the roof 52 of the trailer 20. In this arrangement, the entire interior of the truck is conveniently available for the loading of freight 84 including through the use of forklift trucks 88, from either side or from the rear of the trailer, as indicated in FIGS. 5 and 6. It will be appreciated that the side loading may be either from a dock at truck-floor level as indicated in FIG. 6 or from a lifttruck operating at ground level. The structures and mechanisms by which the deck 70 is manipulated and secured at selectable position is described with reference to FIGS. 10-13. In the specific embodiment of the invention illustrated, the trailer is provided with two pair of hydraulic lift assemblies 100 and two pair of cooperating deck-supporting post assemblies 106. Two of the cooperating hydraulic assemblies and post assemblies are located at the forward end of the trailer, at opposed sides thereof and the second pair is in a midzone of the trailer, at opposite sides. As shown in FIG. 10, one of the composite structures used for elevating and supporting the deck 70 is located adjacent the front wall 56 of the trailer and includes a tubular post 110 the lower end 112 of which rests on and is supported by the floor of the trailer 20. At its upper end the post 110 is secured at a roof beam 114. The post 110 is fitted with an outer sleeve 120 for slidable positioning therealong and to which the deck 70 is fastened by a pivotally mounted plate 122 and welds 124, or other suitable means. The sleeve 120 is provided with a spring-loaded locking pin 126 spring-biased inwardly of the posts 112, the pin 126 being insertable in any of a series of cooperating openings 130 arrayed lineally along the post 110 for selective registry with the pin 126 whereby the sleeve 120 and the deck 70 carried thereby may be positioned and locked at any selectable vertical height.

Elevation of the sleeve 120 and the deck 70 carried thereby is achieved through the action of the hydraulic assembly 100. One such exemplary assembly, as shown in FIG. 10, includes a hydraulic cylinder 134 provided with a suitable hydraulic fluid supply line 136 connected to a hydraulic pump (not shown) and is fastened at its base 138 by means of a clamp or yoke 142 to the post 110 at its lower end 144. A piston rod 150 extending upwardly from and outwardly of the cylinder 134 is fastened by means of a pin and shackle assembly 154 to the slidable sleeve 120. In the arrangement shown, delivery of pressurized hydraulic fluid through the line 136 into the cylinder 34 acts upon a piston 158 forcibly to extend the piston rod 150 and to effect elevation of the sleeve 120 and the deck 70 attached thereto. The locking pin 126 is then inserted into a cooperating opening 130, at the desired elevational level, and the deck 70 is secured in place.

Similar hydraulic lift assemblies 100 and post assemblies 106 are located at a midzone of the trailer 20 at each of opposed sides thereof. As indicated in FIG. 11, the structures include a cylinder 134 and an extendable rod 150 the latter being fastened, at its upper end, through a pivotal pin 164 and a flange 168 to a tubular sleeve 170 slidable upwardly and downwardly on a deck-supporting post 172. A bracket 180 welded 182 to an underside of the deck-supporting beam 186 defines a longitudinally extending opening 190 and a bracket 194 fastened to the sleeve 170 bridges a lower bar 196 of the bracket 180 and carries at its upper end a bearing element 200 which bears against and supports the deck beam 190. As in the deck support assembly previously described, the sleeve 170 carries a locking pin 126 which is biased inwardly by a spring 204, the pin 126 being retractable from and insertable into any of a series of openings 130 in the post 172 so that the deck may be locked at any desired elevational position. The channel 190 defined by the bracket 180 permits a required degree of longitudinal displacement of the deck 70 with respect to the supporting shaft 172, as occurs during angular shifting of the deck 70.

In addition to the front and the side deck elevating assemblies, the trailer of the invention is provided with deck supports and stabilizer assemblies 210 at opposite sides of the truck at the rear. As indicated in FIG. 12, the support assembly 210 includes a shaft or post 214 extending between the floor 40 of the truck and the roof beam 114. A sleeve 216 slidable on the post 214 carries a vertically positionable bracket 220 which includes an arm 224 projecting forwardly of the post 214 along the truck side. The bracket assembly 220 is slidably positionable vertically along the post 214 and is secured at selective positions by means of a pin 226 the projecting shank 230 of which extends through the wall of the sleeve 216 and into a selectable opening in an array of vertically arranged openings formed in the post 214 to lock the bracket a selectable height in a manner as previously described.

At its rearward end and in a zone adjacent the post 214, the deck 70 carries a support shaft 236 which is telescopically secured in an enveloping channel iron 240. The shaft 236 projects laterally to bear upon the arm 224, whereby the rear end of the deck 70 is supported. Securement bolts 244 intercouple the outer channel iron 240 and the interior shaft 236 to fasten the shaft 236 in place.

As previously noted, the principal floor 40 of the trailer 20 is stepped upwardly at its forward end to facilitate coupling attachment of the trailer 20 to a tractor. As shown in FIG. 8, the upwardly displaced floor 250 has an upward pitch beginning at the upper edge of the riser 252 of the step 256. As shown in FIG. 9 and as indicated schematically in FIG. 8, in accordance with the present invention, a ramp assembly 260 is provided as a means for bridging between the forward extremity of the floor 40 and the raised floor 250. As indicated in FIG. 9, the ramp assembly 260 includes a wedge-like component 264 extending from an apex-like edge 266 toward the riser wall 252, the wedge-like ramp 264 having a weight-supporting surface 268. As shown in FIG. 9, the ramp 264 is connected to the raised floor 250 by means of a hinge assembly 272. In the preferred embodiment of the invention depicted, the hinge takes the form of a double hinge having two longitudinally spaced pivot loci or rotation aces. The first rotational axis or hinge shaft 274 is fastened at the forward top edge 278 of the ramp 264 by means of a pair of end plates 280 carrying bushings 284 through which the hinge rod 274 extends. Hingedly mounted on the rod 274 is a second pair of bushings 288, the latter being fastened in turn to a pair of laterally-spaced, ramp-elevating pivot plates 292 extending generally upwardly and forwardly of the hinge rod 274. The pivotal plates 292 are hingedly secured, in turn, to the top edge of the riser wall 252 by means of a laterally extending fixed shaft 296 sleeved into cooperating bushings 300 in the lower forward extremities of the hinge plates 292.

A ramp extension plate 304, for use when the ramp is pivotally hinged to assume its forwardly directed mode to overlie the raised floor section 250, is secured at the apex-like rearward edge 266 of the ramp 264 by means of a hinge 310. In FIG. 9 the plate 304 is seen as in a standby disposition, underlying the floor 312 of the ramp 264. Positioned laterally of the ramp assembly 264 is a second, ramp assembly 260a, the latter corresponding in all material respect to the first ramp assembly 260.

The ramp 264 is shown in FIG. 9 as positioned for facilitating the loading of a vehicle 76 to the front extremity of the trailer 20 with the front car wheels 314 advanced to overlie and bear upon the raised floor 250, as indicated schematically in FIG. 7. As depicted diagramatically in FIG. 8, when it is desired to use the trailer for the transport of general cargo, a leveling of the forward, raised sector 250 of the floor of the trailer is achieved by hingedly pivoting the ramp 260 and the attached elevating plates 292 to overlie the floor section 250. At the same time, the extension plate 304 is hinged forwardly to provide an extension of the floor 312 of the now forwardly directed ramp element 260. As shown in FIG. 8, the extension plate 304 is supported on a forward sill 314 and by means of a plurality of support panels 316 pivotally brought into position to extend between the floor 250 of the trailer 20 and the undersurface of the extension plate 304. Further as clearly shown in FIG. 8, the mechanical arrangement described establishes a flat and level loading surface at the extreme forward end of the trailer, facilitating the loading of cargo from either the side or from the rear of the raised section, using such auxiliary equipment as forklift trucks.

A very important structural feature of the trailer of the present invention resides in the structural configuration of the load-supporting frame 24. As indicated in the fragmentary views of FIGS. 14 and 15, the frame 24 comprises beams which include what may be characterized as a pair of "inside" beams 330 which extend rearwardly and between the laterally-spaced rear wheel assemblies 28 to overlie the rear axle of the trailer 20. Joined to and extending forwardly of the inside beams 330 are a pair of "outside" beams 340 which are joined to the rearwardly-directed inside beams 330. The outside beams 340 extend along an outer margin of the structural frame at a forward end of the trailer and are joined to corresponding arcuately upwardly-extending beam components 344 terminating in a pair of laterally-spaced, generally horizontally projecting arms 350 framing the coupling section which extends over to overlie a tractor to be coupled to the trailer.

The combination of an "outside frame" and an "inside frame" in accordance with the present invention makes it possible to "drop" the floor at the front end of the trailer to extend at a level below the upper margin or edge of the outside beams at the forward end of the trailer, with the floor riding on the upper edges 360 of the inside beams 330 at the rearward end of the trailer. In the particular embodiment of the invention illustrated, and as depicted in FIGS. 14 and 15, the mechanical coupling between and interconnection between the inside beams 330 and the outside beams 340 is through the use of principal parallely disposed front and rear crossbeams 364 and 368 extending transversely of the beams 330 and 340. As indicated in FIG. 14, the inside beams 330 extend at least through the transverse beam 368 and may extend through the forward transverse beam 364. The structure is further stabilized by secondary transverse beams 372 within the body of the assembly bounded by the outer beams 340 and the transverse beams 364 and 368.

The junction between the outside beam members 340 and the inside beam 330 may be physically located anywhere within the "drop" of the frame, that is, at any lineal position between the wheels of the tractor, at the forward end, and the rear wheels of the trailer, at the rearward end. The spacing between the principal crossbeams 364 and 368 is such that a download impressed on the rear transverse beam 368 is substantially equal to an upload impressed on the forward transverse beam 364. The arrangement described prevents the impressed bending moments from twisting the transverse beams 364 and 368.

While in the embodiment of the invention illustrated in FIGS. 14 and 15 the inside beam components 330 and the outer beam elements 340 are shown as separate mechanical components, it is within the inventive concept of the present invention that the inside and outside portions of the framing elements may be part of a single continuous beam which is bent to achieve the desired lateral spacing at the forward and the rearward sections of the longitudinally extending frame 24.

From the foregoing it will be understood that the present invention provides structures which enable one to transport six full-size cars within a 48 foot, standard length trailer and having a standard 13.6 foot height. The mechanical features which contribute to the efficacy of the present invention include the combination of an "inside frame" with an "outside frame". Additionally, the important convertible ramp structures of the invention facilitate not only space-conserving loading of the vehicles for transport, but make it possible as well to use the entire lineal expanse of the trailer for the storage and transport of general freight. Specifically, the provision of pivotal ramps and associated components at the portion of the trailer which overlies the coupler section renders it possible to load freight in that section, from either side or, alternatively, from the rear. The availability of the entire interior of the trailer for the transport of general freight is rendered possible by the "removal" of the deck as an impediment, such removal being effected by elevating the deck to an upwardly displaced, out-of-the-way location adjacent the roof of the trailer.

While this invention has been described with reference to preferred embodiments and procedures, it is evident that the invention is not limited thereto. Further modification of the apparatus and the methods disclosed herein will be immediately evident to those skilled in the art. To the extent that these changes and modifications are within the scope of the appended claims, they are to be considered a part of this invention.

The invention is claimed as follows:

1. In a trailer having a load-supporting frame, a pair of longitudinally-extending,
   laterally-spaced principal, load-bearing beams, and a floor supported by said beams,
   the improvement wherein said frame comprises a combination of inside beams disposed laterally inwardly of rear wheels of said trailer and having lower limits substantially below upper reaches of said rear wheels, and outside beams extending along an outer margin of said frame beginning at a point forward of said rear wheels and extending to a forward end of said trailer,
   crossbeams extending transversely of and interconnecting said inside beams and said outside beams to provide a unitary, floor-supporting, load-carrying underframe, of said trailer,
   said outside beams having opposed forwardmost portions thereof displaced upwardly and terminating in a pair of laterally-spaced, generally horizontally projecting arms for supporting a raised floor section for overlying a tractor to be coupled to said trailer, and
   ramp means positionable to extend between said floor of said trailer and said raised floor section as a communicating bridge therebetween to facilitate access to and delivery of freight to said raised floor section for transport in said trailer,
   said raised floor section including a floor portion inclined upwardly from a rear end thereof forwardly,
   hinge means and means fastening said hinge means to said ramp means at a forward end thereof and to said raised floor section at a rearward end thereof for hingedly pivoting said ramp means during selective positioning thereof from a rearwardly-directed orientation in which said ramp means overlies and is supported on said floor of said trailer, to a forwardly disposed orientational mode in which said ramp means overlies and is supported on said raised floor section to provide a horizontal loading surface for support of cargo thereon.

2. The structure as set forth in claim 1 and further comprising a plurality of ramps for selective placement at spaced positions along a lineal expanse of said floor for inclining vehicles carried thereon, thereby to effect a tilting of and a physical overlapping of floor-carried vehicles to conserve longitudinal space utilized and to extend an effective functional length dimension of said trailer at a floor level thereof, and to reduce an overall length demand of a file or lineally arrayed vehicles carried on said floor of said trailer.

3. The structure as set forth in claim 1 and further comprising plate means hingedly fastened to said ramp means along an apex-like end edge thereof, said plate means being unfoldable forwardly to overlie and establish an extension defining a horizontal loading surface overlying said raised floor section of said trailer.

4. The structure as set forth in claim 3 and further comprising a plurality of adjustable supports positionable to assume a generally upright attitude beneath said plate means therebelow to sustain said plate means against pressure applied downwardly thereagainst.

5. In a trailer having a load-supporting frame, a pair of longitudinally-extending, laterally-spaced principal, load-bearing beams, and a floor supported by said beams,
   the improvement wherein said frame comprises a combination of inside beams disposed laterally inwardly of rear wheels of said trailer and having lower limits substantially below upper reaches of said rear wheels, and outside beams extending along an outer margin of said frame beginning at a point forward of said rear wheels and extending to a forward end of said trailer,
   crossbeams extending transversely of and interconnecting said inside beams and said outside beams to provide a unitary, floor-supporting, load-carrying underframe of said trailer,
   said outside beams having opposed forwardmost portions thereof displaced upwardly and terminating in a pair of laterally-spaced, generally horizontally projecting arms for supporting a raised floor section for overlying a tractor to be coupled to said trailer, and
   ramp means positionable to extend between said floor of said trailer and said raised floor section as a communicating bridge therebetween to facilitate access to and delivery of freight to said raised floor section for transport in said trailer, said raised floor section including a floor portion inclined upwardly from a rear end thereof forwardly, hinge means and means fastening said hinge means to said ramp means at a forward end thereof and to said raised floor section at a rearward end thereof for hingedly pivoting said ramp means during selective positioning thereof from a rearwardly-directed orientation in which said ramp means overlies and is supported on said floor of said trailer, to a forwardly disposed orientational mode in which said ramp means overlies and is supported on said raised floor section to provide a horizontal loading surface for support of cargo thereon, said raised floor section being pitched upwardly from a rear end forwardly, and wherein said ramp means includes a pair of laterally-spaced ramps which in a configuration to overlie said raised floor section provide an essentially level load supporting floor for facilitating loading of freight thereon.

6. A trailer comprising a continuous floor and means supporting said floor for selectively carrying general freight and a number of automobiles, said floor including an elevated forward floor section for overlying a tractor to be coupled to said trailer and a level lower rear floor section, selectively extendable and retractable ramps means on said floor for supporting said automobiles in lineally overlapping relationship and inclined with respect to said floor upon extensions of said ramp means, a forward endwall and sidewall means extending upwardly from said floor said forward endwall including a forwardly projecting bay spaced above said floor for accommodating an end portion of an automobile supported on said deck, wherein said trailer includes spaced apart rear wheels adjacent opposite sides thereof, and an elongate, unitary upper deck coextensive with said floor for supporting the same number of automobiles as on said floor and in an end to end array, said upper deck being selectively positionable between an inclined, automobile-loading position, and a horizontal and elevated automobile-transporting position, and being elevatable to a raised storage position, said means supporting said floor comprising longitudinally extending outside beam elements having an upper edge supporting said floor and extending below an upper reach of said rear wheels, and having a lower edge substantially below an upper reach of said rear wheels, longitudinally extending inside beam element having an upper edge supporting said rear floor section at a height above a top of said rear wheels, said inside beam elements including a portion extending inwardly of and directly between said rear wheels and having a lower edge substantially below an upper reach of said rear wheels.

7. The improvement as set forth in claim 6 and further comprising a continuous unitary planar deck overlying said floor and linearly coexisting therewith and support post means at opposed elevated position, and pivot pin means for supporting said deck on said post means for facilitating angular positioning of said deck carried by said post means.

8. The improvement as set forth in claim 6 wherein said trailer has open sides for side-access loading, and further comprising side curtain means for closing the sides of said trailer for cargo protection and security.

9. The structure as set forth in claim 6 and further comprising cross-beam bolster means for providing a torque-resisting, transverse, mechanical intercoupling between said longitudinally extending outside beam elements and said longitudinally extending inside beam elements, said bolster means being forwardly of said rear wheels of said trailer, and rearwardly of a forward end thereof, said bolster means including a pair of parallel crossbeams extending transversely of said inside and of said outside beam elements and spaced from one another to define a forward crossbeam and rearward crossbeam, said parallel crossbeams comprising means extending transversely between and mechanically coupling both said inside and said outside beam elements for ensuring that a downwardly directed load impressed upon said rearward crossbeam is comparable to an upward load exerted on said forward crossbeam, thereby to prevent load-derived distortion of said crossbeams, said bolster means further comprising secondary transverse beams within the bounds of said bolster means for further stabilizing said structure.

* * * * *